US012731449B2

(12) United States Patent
Kuramoto

(10) Patent No.: US 12,731,449 B2
(45) Date of Patent: Sep. 8, 2026

(54) VISITOR MANAGEMENT APPARATUS, VISITOR MANAGEMENT METHOD AND NON-TRANSITORY RECORDING MEDIUM

(71) Applicant: NEC Corporation, Tokyo (JP)

(72) Inventor: Shinya Kuramoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 2 days.

(21) Appl. No.: 18/848,567

(22) PCT Filed: Mar. 23, 2022

(86) PCT No.: PCT/JP2022/013418
§ 371 (c)(1),
(2) Date: Sep. 19, 2024

(87) PCT Pub. No.: WO2023/181153
PCT Pub. Date: Sep. 28, 2023

(65) Prior Publication Data
US 2025/0225831 A1 Jul. 10, 2025

(51) Int. Cl.
*G07C 9/00* (2020.01)

(52) U.S. Cl.
CPC ................................ *G07C 9/00563* (2013.01)

(58) Field of Classification Search
CPC ....... G07C 9/00563; G07C 9/00; G08B 25/04
USPC ........................................................ 340/5.52
See application file for complete search history.

(56) References Cited

U.S. PATENT DOCUMENTS 11,749,043 B2 * 9/2023 Chafni ................. G06N 3/0464
340/5.52
2013/0017812 A1 * 1/2013 Foster ................. H04L 12/2825
340/5.7
2020/0151977 A1 * 5/2020 Vos ........................ H04N 7/186
2021/0134100 A1 * 5/2021 LaRovere .......... G07C 9/00571
(Continued)

FOREIGN PATENT DOCUMENTS

JP 2004-240839 A 8/2004
JP 2006-155402 A 6/2006
JP 2007-150670 A 6/2007
(Continued)

OTHER PUBLICATIONS

JP2007-150670A; English translation of description; Intercom system; Oshima Toshihiro (2007) (Year: 2007).*
(Continued)

*Primary Examiner* — Nam V Nguyen
(74) *Attorney, Agent, or Firm* — Sughrue Mion, P.LLC.

(57) ABSTRACT

A visitor management apparatus 1 is provided with: an identification information acquiring part 11 for acquiring biometric information of a visitor coming to a building, an evaluation value acquiring part 12 for acquiring each of evaluation values for visitors by residents living in the building, an integration part 15 for generating an integrated evaluation value by integrating each of evaluation values by each of residents, a storing part 13 for storing the biometric information corresponding to the visitor and the integrated evaluation value corresponding to the visitor in association with each other, and a providing part 14 for providing the integrated evaluation value corresponding to the visitor stored in the storing part 13 to a resident living in the building.

5 Claims, 10 Drawing Sheets

(56) References Cited

U.S. PATENT DOCUMENTS

| | | | | |
|---|---|---|---|---|
| 2022/0207972 | A1* | 6/2022 | Madden | G08B 13/19645 |
| 2023/0062133 | A1* | 3/2023 | LaRovere | G07C 9/00174 |

FOREIGN PATENT DOCUMENTS

| | | | |
|---|---|---|---|
| JP | 2008-299461 | A | 12/2008 |
| JP | 2009-206784 | A | 9/2009 |
| JP | 2010-098598 | A | 4/2010 |
| JP | 2010-212787 | A | 9/2010 |
| JP | 2018-151838 | A | 9/2018 |
| JP | 2019-050496 | A | 3/2019 |
| JP | 2020-127177 | A | 8/2020 |
| JP | 2020-184657 | A | 11/2020 |

OTHER PUBLICATIONS

JP2008-299461A; English translation of description; Safety identification method for visitor; Tanabe Satoru (2008) (Year: 2008).*

JP2010-098598A; English translation of description; Intercom apparatus; Nakayama Tomofumi; (2010) (Year: 2010).*

JP Office Action for JP Application No. 2024-508875, mailed on May 7, 2025 with English Translation.

International Search Report for PCT Application No. PCT/JP2022/013418, mailed on Jun. 7, 2022.

* cited by examiner

VISITOR MANAGEMENT APPARATUS, VISITOR MANAGEMENT METHOD AND NON-TRANSITORY RECORDING MEDIUM

This application is a National Stage Entry of PCT/JP2022/013418 filed on Mar. 23, 2022, the contents of all of which are incorporated herein by reference, in their entirety.

TECHNICAL FIELD

This discloser relates to technical fields of a visitor management apparatus, a visitor management method and a recording medium.

BACKGROUND ART

A patent literature 1 discloses a technique for improving defense against unwanted visitors by acquiring target information including information relating to a person performing at least one of calling a callee and speech-communicating a calling destination by using a slave set, accumulating the target information, changing a response to a user on the basis of the accumulated target information. A patent literature 2 discloses a technique for preventing a visited person being forced to respond to a visitor in an undesirable way by a response controlling apparatus, which notifies a user of an arrival of a visitor by communicating a calling apparatus operated by the visitor, acquiring identification information detected from a medium held by the visitor, and performing control of at least one of a notify aspect when the arrival is notified to the user, and a presentation aspect when information is presented to the visitor according to whether or not the identification information is acquired or the acquired identification information. A patent literature 3 discloses a technique for improving reliability of visitor information stored in a door phone apparatus 1 and enabling quick acquisition and viewing of visitor information from other door phone apparatus, wherein the door phone apparatus is connected to a communication line, the door phone apparatus is provided with a visitor information input means and a visitor information store processing means, and the door phone apparatus is provided with an information terminal searching means for searching visitor information stored in the other door phone apparatus, a sharing request information transmitting means for requesting sharing of the visitor information stored in the other door phone apparatus, a permission information receiving means for receiving permission information for determining sharing is permitted from the other door phone apparatus, and a visitor information acquiring means for acquiring the visitor information, sharing of which is permitted, from the other door phone apparatus. A patent literature 4 discloses a technique in which an image data of a visitor and attribute information associated with the visitor are sent to a sharing server by using a home-use terminal, the sharing server collects registered visitor data into a sharing database, when matching with already registered visitor data is instructed, the sharing server extracts an image data of a person with high similarity from visitor data accumulated in the sharing database, and displays the image data with attribute information of the person to the homo-use terminal, since a visited person can perform more accurate match against the visitor, it is possible to increase a level of security and increase reliability of registered information relating to the visitor used for matching. A patent literature 5 discloses a technique for monitoring and restricting a behavior range and a behavior pattern of a visitor at a common area in an entrance of an apartment complex by a first information acquiring means acquiring visitor-specific person information at a common entrance lobby of the apartment complex, and storing it into a storage means, wherein a common area in the apartment complex is divided into identifiable zones, a second information acquiring means is set at each of zones, a permission zone setting means setting only minimum requirement common zones for reaching a house of a resident who has given permission of entering a building to a visitor through communication between a lobby intercom and a house intercom as a permission of entering the building zone for the visitor, a determining means determining where the visitor is located in a common zone of the apartment complex and whether the common zone is the permission of entering the building zone for the visitor on the basis of information of the storage means and acquired information of the acquiring means, and performing warning and guidance.

CITATION LIST

Patent Literature

Patent Literature 1: Japanese Patent Application Laid Open No. 2020-184657
Patent Literature 2: Japanese Patent Application Laid Open No. 2019-050496
Patent Literature 3: Japanese Patent Application Laid Open No. 2010-212787
Patent Literature 4: Japanese Patent Application Laid Open No. 2006-155402
Patent Literature 5: Japanese Patent Application Laid Open No. 2004-240839

SUMMARY

Technical Problem

This disclosure is to provide a visitor management apparatus, a visitor management method and a recording medium aiming to improve techniques described in the prior art literatures.

Solution to Problem

One aspect of a visiting management apparatus is provided with: an identification information acquiring means for acquiring biometric information of a visitor coming to a building, an evaluation value acquiring means for acquiring each of evaluation values for visitors by residents living in the building, an integration means for generating an integrated evaluation value by integrating each of evaluation values by each of residents, a storing means for storing the biometric information corresponding to the visitor and the integrated evaluation value corresponding to the visitor in association with each other, and a providing means for providing the integrated evaluation value corresponding to the visitor stored in the storing means to a resident living in the building.

One aspect of a visiting management method includes acquiring biometric information of a visitor coming to a building, acquiring each of evaluation values for visitors by residents living in the building, generating an integrated evaluation value by integrating each of evaluation values by each of residents, storing the biometric information corresponding to the visitor and the integrated evaluation value corresponding to the visitor in association with each other, and providing the stored integrated evaluation value corresponding to the visitor to a resident living in the building.

One aspect of a recording medium on which a computer program is recorded, wherein the computer program causes a computer to execute a management method including: acquiring biometric information of a visitor coming to a building, acquiring each of evaluation values for visitors by residents living in the building, generating an integrated evaluation value by integrating each of evaluation values by each of residents, storing the biometric information corresponding to the visitor and the integrated evaluation value corresponding to the visitor in association with each other, and providing the stored integrated evaluation value corresponding to the visitor to a resident living in the building.

DESCRIPTION OF EXAMPLE EMBODIMENTS

Hereinafter, embodiments of a visitor management apparatus, a visitor management method and a recording medium will be described with referring to figures.

1: First Embodiment

First embodiments of a visitor management apparatus, a visitor management method and a recording medium will be described. Hereinafter, the first embodiments of the visitor management apparatus, the visitor management method and the recording medium will be described by using a visitor management apparatus 1 to which the first embodiments of the visitor management apparatus, the visitor management method and the recording medium are applied.

[1-1: Configuration of the Visitor Management Apparatus 1]

Figure 1:
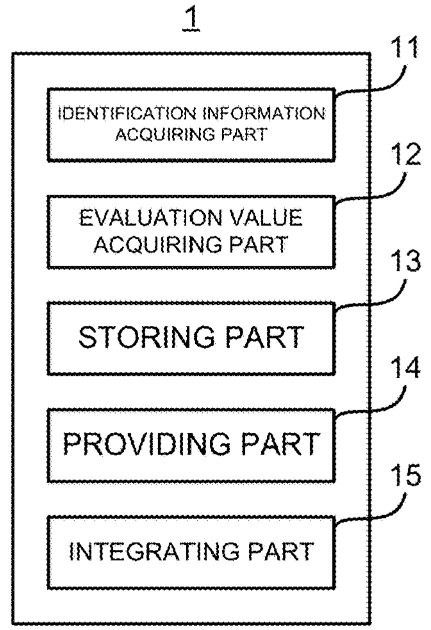
FIG. 1 is a block diagram showing configuration of a visitor management apparatus in a first embodiment.

Configuration of the visitor management apparatus 1 in the first embodiment will be described with referring to FIG. 1. FIG. 1 is a block diagram showing the configuration of the visitor management apparatus in the first embodiment.

As shown in FIG. 1, the visitor management apparatus 1 is provided with a identification information acquiring part 11, an evaluation value acquiring part 12, a storing part 13, a providing part 14 and an integration part 15. The identification information acquiring part 11 acquires biometric information of a visitor coming to a building. The evaluation value acquiring part 12 acquires each of evaluation values for visitors by residents living in the building. The integration part 15 generates an integrated evaluation value by integrating each of evaluation values by each of residents. The storage part 13 stores the biometric information corresponding to the visitor and the integrated evaluation value corresponding to the visitor in association with each other. The providing part 14 provides the integrated evaluation value corresponding to the visitor stored in the storing part 13 to a resident living in the building.

[1-2: Technical Effect of the Visitor Management Apparatus 1]

Since the visitor management apparatus 1 in the first embodiment generates the integrated evaluation value by integrating each of evaluation values by each of residents, it is possible to provide useful information for residents.

2: Second Embodiment

Second embodiments of a visitor management apparatus, a visitor management method and a recording medium will be described. Hereinafter, the second embodiments of the visitor management apparatus, the visitor management method and the recording medium will be described by using a visitor management apparatus 2 to which the second embodiments of the visitor management apparatus, the visitor management method and the recording medium are applied.

The visitor management apparatus 2 may be used in a building in which a plurality of residents living in such as an apartment complex e.g., a large apartment house, an apartment house, or the like. An apartment complex management association, which is a corporation, may manage the building such as the apartment complex. The visitor management apparatus 2 may be applied to a building in which a plurality of households share the same entrance. A building corresponding to the visitor management apparatus 2 is not limited to one building. A plurality of buildings that have entrances differing from each other, respectively, and that are managed by the same corporation, may be associated with the same visitor management apparatus 2.

[2-1: Configuration of the Visitor Management Apparatus 2]

Figure 2:
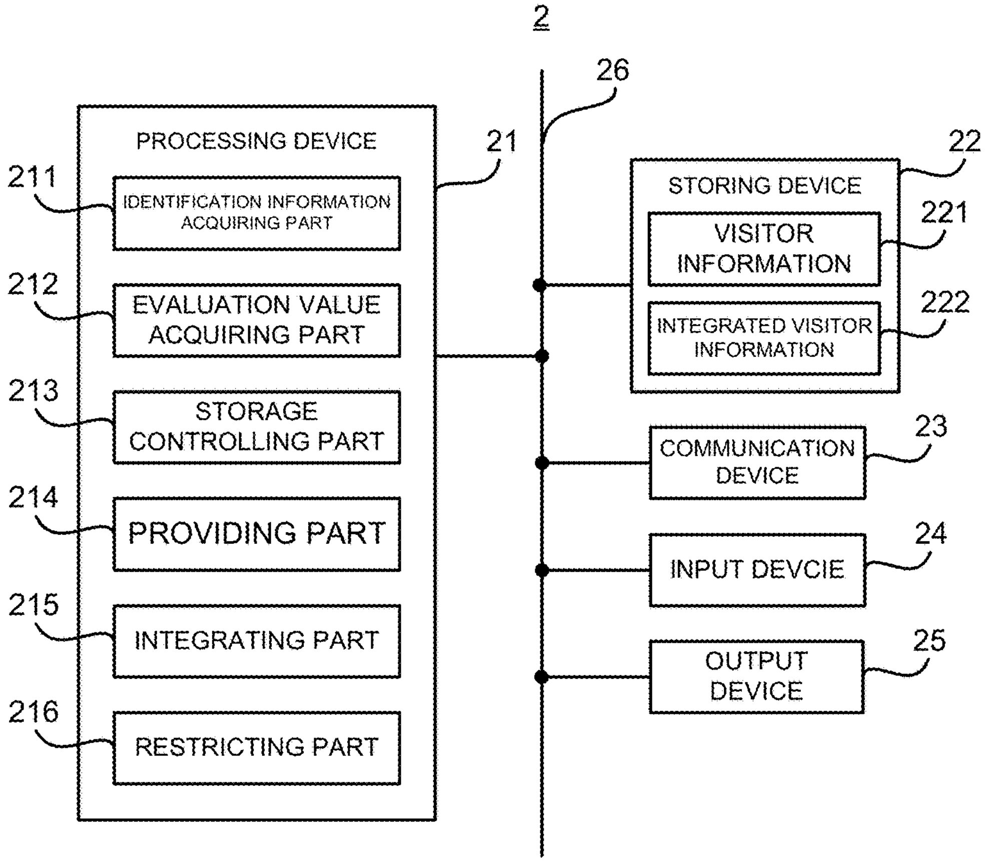
FIG. 2 is a block diagram showing configuration of a visitor management apparatus in a second embodiment.

Configuration of the visitor management apparatus 2 in the second embodiment will be described with referring to FIG. 2. FIG. 2 is a block diagram showing the configuration of the visitor management apparatus 2 in the second embodiment.

As shown in FIG. 2, the visitor management apparatus 2 is provided with a processing device 21 and a storing device 22. Furthermore, the visitor management apparatus 2 may be provided with a communications device 23, an input device 24 and an output device 25. However, the visitor management apparatus 2 may not be provided with at least one of the communication device 23, the input device 24 and the output device 25. The processing device 21, the storage device 22, the communication device 23, the input device 24 and the output device 25 may be connected through a data bus 26.

The processing device 21 includes at least one of a CPU (Central Processing Unit), a GPU (Graphics Processing Unit) and an FPGA (Field Programmable Gate Array), for example. The processing device 21 reads computer programs. For example, the processing device 21 may read a computer program stored in the storing device 22. For example, the processing device 21 may read a computer program recorded on a computer readable and non-transitory recording medium by using a not shown recording medium reading device (e.g., the input device 24 described later) comprised in the visitor management apparatus 2. The processing device 21 may acquire (in other words, download or read) a computer program from a not shown apparatus outside of the visitor management apparatus 2 through the communication device 23 (or another communication device). The processing device 21 executes read computer programs. As a result, logical functional blocks for performing operation to be performed by the visitor management apparatus 2 are realized in the processing device 21. In other words, the processing device 21 can function as a controller to realizing logical functional blocks for performing operation (i.e., process) to be performed by the visitor management apparatus 2.

FIG. 2 shows one example of logical functional blocks realized in the processing device 21 for performing visitor management operation. As shown in FIG. 2, in the processing device 21, an identification information acquiring part 211, which is one specific example of an "identification information acquiring means", an evaluation value acquiring part 212, which is one specific example of an "evaluation value acquiring means", a storage controlling part 213, which is one specific example of a "storing means", a providing part 214, which is one specific example of a "providing means", an integrating part 215, which is one specific example of an "integrating means", and a restricting part 216, which is one specific example of a "restricting means", are realized. However, the processing device 21 may not be provided with the restricting part 216. Operations of the identification information acquiring part 211, the evaluation value acquiring part 212, the storage controlling part 213, the providing part 214, the integrating part 215 and the restricting part 216, respectively, will be described later with referring to FIG. 3-FIG. 5.

The storing device 22 can store desired data. For example, the storing device 22 may temporally store computer programs executed by the processing device 21. The storing device 22 may temporally store data temporally used by the processing device 21 when the processing device 21 is executing a computer program. The storing device 22 may store data to be stored for a long time by the visitor management apparatus 2. Wherein, the storing device 22 may include at least one of a RAM (Random Access Memory), a ROM (Read Only Memory), a hard disk device, an optical magnetic disk device, an SSD (Solid State Drive), and a disk array device. In other words, the storing device 22 may include non-transitory recording medium.

The communication device 23 can communicate with an apparatus outside of the visitor management apparatus 2 through a not shown communication network. The communication device 23 may be a communication interface based on standards such as Ethernet (registered trademark), Wi-Fi (registered trademark), and Bluetooth (registered trademark).

The input device 24 is a device receiving information input to the visitor management apparatus 2 from outside of the visitor management apparatus 2. For example, the input device 24 may include an operation device (e.g., at least one of a keyboard, a mouse trackball, a touch panel, a pointing device such as a pen tablet, a button, etc.) which can be operated by an operator of the visitor management apparatus 2. For example, the input device 24 may include a reading device, which can read information recorded, as data, on a recording medium being able to externally attach to the visitor management apparatus 2.

The output device 25 is a device outputting information to outside of the visitor management apparatus 2. For example, the output device 25 may output information as images. In other words, the output device 25 may include a display device (so-called display) which can display an image indicating outputted information. As examples of the display device, a liquid crystal display, an OLED (Organic Light Emitting Diode) display, and the like are cited. For example, the output device 25 may output information as sound. In other words, the output device 25 may include a sound device (so-called speaker) which can output sound. For example, the output device 25 may output information to papers. In other words, the output device 25 may include a printing device (so-called printer) which can print desired information to papers. Moreover, the input device 24 and the output device 25 may be integrally formed as a touch panel.

Incidentally, since the hardware configuration shown in FIG. 2 is an example, a device other than devices shown in FIG. 2 may be added, or a part of devices may be not provided. Moreover, a part of devices may be replaced with other device having the similar function. Moreover, a part of functions of the second embodiment may be provided to other apparatus through a network. Functions of the second embodiment may be distributed to a plurality of apparatuses, and the functions may be realized by the plurality of apparatuses. In this way, the hardware configuration shown in FIG. 2 may be modified as appropriate.

Figure 3:
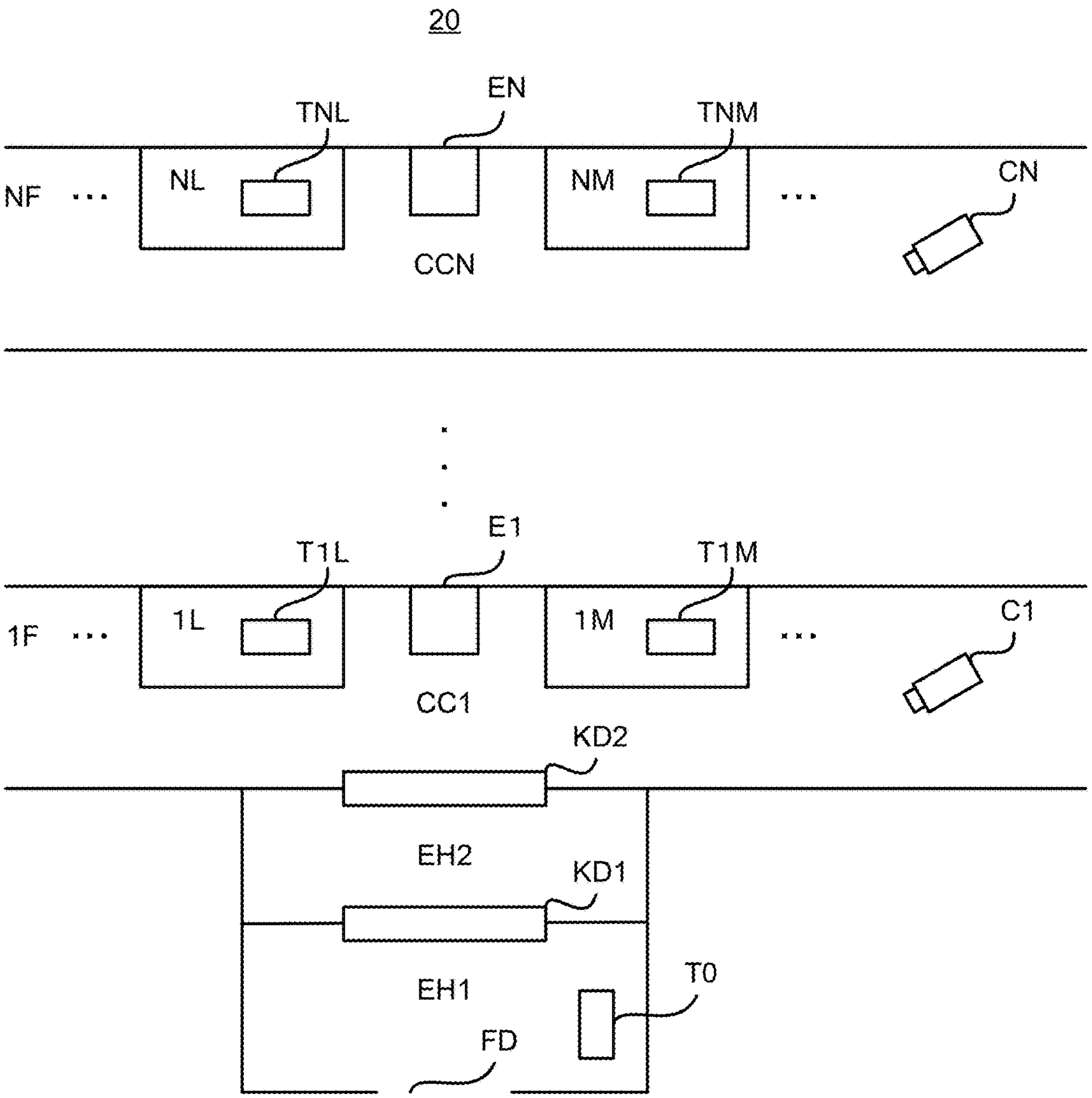
FIG. 3 is a conceptual scheme showing a building to which the visitor management apparatus in the second embodiment is applied.
Figure 4:
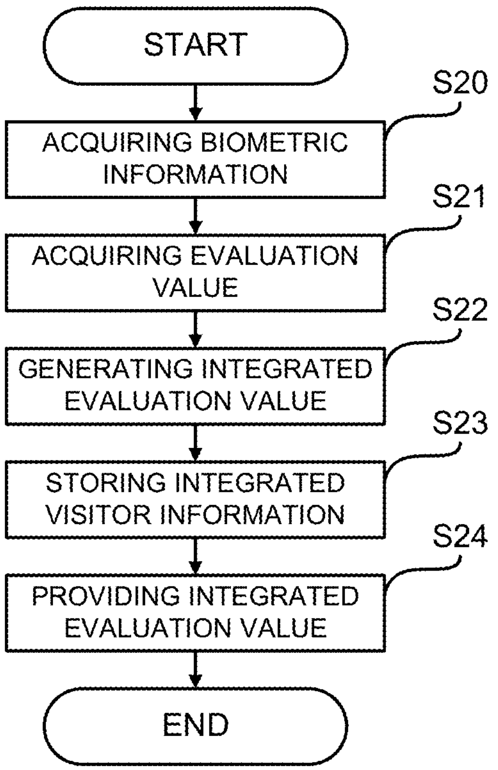
FIG. 4 is a flowchart showing flow of a first example of visitor management operation performed by the visitor management apparatus in the second embodiment.
Figure 5:
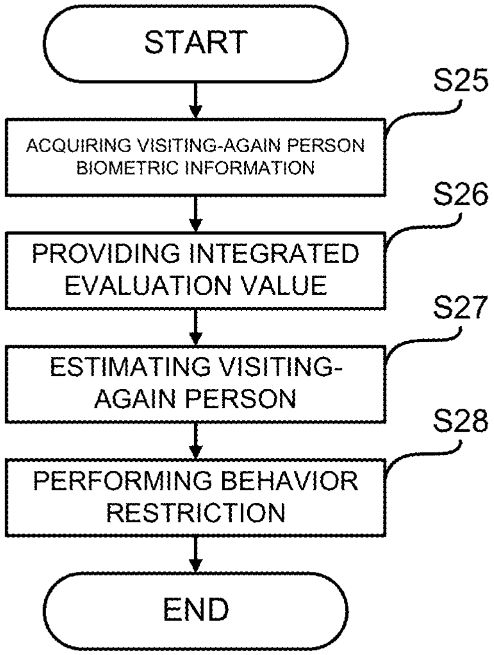
FIG. 5 is a flowchart showing flow of a second example of visitor management operation performed by the visitor management apparatus in the second embodiment.

Flow of visitor management operation performed by the visitor management apparatus 2 in the second embodiment will be described with referring to FIG. 3-FIG. 5. FIG. 3 is a conceptual scheme showing a building to which the visitor management apparatus 2 in the second embodiment is applied. FIG. 4 is a flowchart showing flow of a first example of visitor management operation performed by the visitor management apparatus 2 in the second embodiment. FIG. 5 is a flowchart showing flow of a second example of visitor management operation performed by the visitor management apparatus 2 in the second embodiment.

[2-2: Building 20 to which the Visitor Management Apparatus 2 is Applied]

The building 20 exemplified in FIG. 3 may be a building having N-stores, i.e., a first floor 1F to an Nth floor NF. The building 20 has an entrance hall EH1 in which anyone can enter. The entrance hall EH1 may be provided with a free entrance and exit door FD, in which anyone can freely enter and exit, a first key door KD1, in which only allowed person can pass, and a visitor operating terminal T0. The visitor operating terminal T0 may be a terminal operated by a person who is unable to unlock the first key door KD1 by oneself such as a visitor. A visitor or the like may call a resident who lives in a destination by operating the visitor operating terminal T0. Moreover, the operated visitor operating terminal T0 may acquire personal identification information of the visitor. The personal identification information may be information that allows individuals to be easily identified.

The first floor 1F may be provided with one or more dwellings such as a dwelling 1L and a dwelling 1M, a common aisle CC1, a camera C1 imaging at least the common aisle CC1, an elevator E1 for moving to other floors, and the like. Similarly, the Nth floor NF may be provided with one or more dwellings such as a dwelling NL and a dwelling NM, a common aisle CCN, a camera CN imaging at least the common aisle CCN, an elevator EN for moving to other floors, and the like. The camera C1 and the camera CN may image an imaging range at all times.

The personal identification information may include biometric information. The biometric information may include facial information, iris information, fingerprint information, voiceprint information, or the like. The personal identification information may include information that can be acquired from an ID card or the like including personal specifiable information. The personal identification information may include attribute information of a visitor. The attribute information of the visitor may be information relating to appearance of the visitor, such as wearing goods of the visitor, height of the visitor, outline of a face of the visitor, and physiognomy of the visitor.

A subject acquiring private identification is an apartment complex management association managing the building 20. Therefore, acquired personal identification information can be used for a purpose of entering/leaving management, behavior restriction, or the like of visitors in such as shared areas in the building 20. Moreover, the acquired personal identification information can be shared among residents of the building 20 constituting the apartment complex management association for the purpose of the entering/leaving management, behavior restriction, or the like of visitors in such as the shared areas in the building 20. The shared areas in the building 20 may include the entrance hall EH2, the common aisle CC1 and the common aisle CCN, for example.

[2-3: First Example of Visitor Management Operation Performed by the Visitor Management Apparatus 2]

As shown in FIG. 4, the identification information acquiring part 211 acquires personal identification information of a visitor to a building (step S20). The identification information acquiring part 211 may acquire biometric information of the visitor to the building. The identification information acquiring part 211 may acquire the personal identification information of the visitor by the visitor operating the visitor operation terminal T0.

The evaluation value acquiring part 212 acquires an evaluation value for the visitor by residents living in the building (step S21). The resident may perform evaluation for the visitor by operating a terminal that is provided in a dwelling. For example, a resident living in the dwelling NL may perform evaluation for the visitor by operating a terminal TNL. The terminal may be a smartphone possessed by a resident. The storage controlling part 213 may associate the biometric information corresponding to the visitor, the evaluation value for the visitor by the resident and resident identification information for identifying the resident who has performed the evaluation each other, and store in the storage device 22 as visitor information 221. The storage controlling part 213 may also associate and store one or more attribute information of the visitor as the visitor information 221. The storage controlling part 213 may store information for identifying a dwelling as the resident identification information. An example of the visitor information 221 that the storage controlling part 213 stores in the storage device 22 is exemplified in Table 1 below.

TABLE 1

| Resident identification information | Visitor biometric information | Visitor attribute information 1 | . . . | Visitor attribute information X | Evaluation value |
|---|---|---|---|---|---|
| 1L | Facial information A | Wearing goods information A | . . . | Physiognomy information A | 7 |
| 1L | Facial information B | Wearing goods information B | . . . | Physiognomy information B | 8 |
| 1M | Facial information A | Wearing goods information A | . . . | Physiognomy information A | 6 |
| NL | Facial information B | Wearing goods information B | . . . | Physiognomy information B | 8 |
| NL | Facial information C | Wearing goods information C | . . . | Physiognomy information C | 4 |
| NM | Facial information A | Wearing goods information A | . . . | Physiognomy information A | 8 |

The integrating part 215 generates an integrated evaluation value by integrating each of evaluation values (step S22). The integrating part 215 may be perform integration by adding each of evaluation values. The integrating part 215 may generate an average value of each of evaluation values. The integrating part 215 may generate an integrated evaluation value on the basis of comparative between evaluation values and a predetermined threshold value. The integrating part 215 may generate an integrated evaluation value on the basis of each evaluation values evaluated in a predetermined period such as half a year.

The integrating part 215 may generate information indicating distribution of each of evaluation values as an integrated evaluation value. The integrating part 215 may generate a histogram of each of evaluation values. When the histogram is generated, it is possible to easily understand how many residents having performed high-evaluation, and how many residents having performed low-evaluation. The integrating part 215 can generate information that allows reference to evaluations of all residents living in the building 20.

When evaluation values are integrated, it is easy to understand evaluations of all of residents for visitors, especially when there are many residents living in the building 20. Since a resident visited by a visitor easily judges about the visitor, it is convenient. Even in an event of inappropriate judgment by a small number of residents, the visitor management apparatus 2 can provide appropriate judgment information by performing appropriate judgment by other residents. The visitor management apparatus 2 safely manages visitors because evaluations for visitors do not depend only on an individual's judgment.

The integrating part 215 may include not only information of evaluation value but also the number of evaluators in the integrated evaluation value. In this case, a resident can easily judge whether the integrated evaluation value is credible information or not.

The storage controlling part 213 stores biometric information corresponding to the visitor and the integrated evaluation value corresponding to the visitor in associated with each other (step S23). The storage controlling part 213 may associate biometric information corresponding to the visitor with the integrated assessment value corresponding to the visitor, and store them as an integrated visitor information 222 in the storing device 22. The storage controlling part 213 may also associate and store one or more attribute information of the visitor as the integrated visitor information 222. An example of the integrated visitor information 222 that the storage controlling part 213 stores in the storing device 22 is exemplified in Table 2 below.

TABLE 2

| Visitor biometric information | Visitor attribute information 1 | . . . | Visitor attribute information X | Integrated evaluation value |
|---|---|---|---|---|
| Facial information A | Wearing goods information A | . . . | Physiognomy information A | 7 |
| Facial information B | Wearing goods information B | . . . | Physiognomy information B | 8 |
| Facial information C | Wearing goods information C | . . . | Physiognomy information C | 4 |

The providing part 214 provides the integrated evaluation value corresponding to the visitor stored in the storing device 22 to the resident living in the building 20 (step S24).

It is assumed that a visitor, who has visited to the building 20, visits to a resident, who differs from a resident visited by the visitor, living in another dwelling of the same building 20. In this case, when each resident is called from the visitor via a terminal, an integrated evaluation value corresponding to the visitor is provided to a monitor of the terminal, thereby each resident may be able to confirm evaluation for the visitor of each resident. Each resident can use the integrated evaluation value to judge that the visitor is allowed or denied.

Judgement to allow or deny the visitor by each resident may be integrated. For example, when a visitor, who is a delivery person of a home-delivery object, visits a plurality of residents living in the building 20, operation of the visitor operating terminal T0 by the visitor may be once. Acquiring operation for personal identification information of the visitor may be once at one time during a single visit to the building 20. Thus, convenience of the visitor is high.

[2-4: Second Example of Visitor Management Operation Performed by the Visitor Management Apparatus 2]

As an example of using an integrated evaluation value, the visitor management apparatus 2 may perform behavior restriction operation for a visitor.

As shown in FIG. 5, the identification information acquiring part 211 acquires personal identification information of a visiting-again person who visits again (step S250). The identification information acquiring part 211 may acquire visiting-again person biometric information of the visiting-again person who visits again. The identification information acquiring part 211 may acquire the personal identification information of the visiting-again person by operating the visitor operating terminal T0 by the visiting-again person.

The providing part 214 provides the integrated visitor information 222 stored in the storing device 22 to a resident living in a destination of the visiting-again person (step S26). Moreover, when the visitor information 221 by the resident living in the destination is stored in the storing device 22, the visitor information 221 may be provided to the resident.

The restricting part 216 estimates which person the visiting-again person is on the basis of the visiting-again person biometric information (step S27). The restricting part 216 may search biometric information of a person who is the same as the visiting-again person from biometric information stored in the storing device 22.

The restricting part 216 imposes a behavior restriction corresponding to the integrated evaluation value associated with biometric information of the person, who is the same as the visiting-again person, on the visiting-again person (step S28). The restricting part 216 may change the behavior restriction imposed on the visiting-again person in response to a request for a behavior restriction on the basis of at least one of the visitor information 221 and the integrated visitor information 222 by the resident living in the destination of the visiting-again person. When a resident living in a destination rejects a visitor, the restricting part 216 may restrict behavior toward a door of a dwelling of the destination even if the visitor is a visitor of whom an integrated evaluation value is high.

On the other hand, the restricting part 216 may permit a visitor to enter until a door of a dwelling of a destination without permission of a resident of the destination when an integrated evaluation value of the visitor is high. In this case, the operation of the step S26 may be omitted.

The restricting part 216 may set a threshold value of an integrated evaluation value, and may determine whether or not behavior restriction in the building 20 is imposed by comparing the integrated evaluation value with the threshold value. The restricting part 216 may set behavior restrictions according to integrated evaluation values by dividing into multiple-steps levels. The restricting part 216 may arbitrarily set a range of a behavior restriction.

The restricting part 216 may set a behavior restriction for a visitor by a blacklist method. For example, the restricting part 216 may output for calling attention when a visitor having a low integrated evaluation value comes. Moreover, for example, the restricting part 216 may prohibit that a visitor having a low integrated evaluation value calls via an intercom.

Alternatively, the restricting part 216 may set a behavior restriction for a visitor by a whitelist method. For example, the restricting part 216 may output for recommending a person when a visitor having a high integrated evaluation value comes.

The restricting part 216 may perform behavior restrictions of the following five steps levels according to integrated evaluation values, for example.

First Level: Rejecting unlock of the first key door KD1;

Second Level: Rejecting unlock of the second key door KD2; In this case, a visitor can enter until the entrance hall EH2; For example, a delivery person waits in the entrance hall EH2, and a resident go to the entrance hall EH2 to collect a home-delivery object;

Third Level: Permitting moving on a root to the front of a door of a dwelling of a destination; In this case, the restricting part 216 may guide a visitor to the root to the front of the door of the dwelling of the destination by turning on guide lights and/or by changing brightness of lights; Moreover, the restricting part 216 may warn a visitor by generating warning sounds when the visitor intends to move into an area other than the root to the front of the door of the dwelling of the destination;

Fourth Level: Permitting moving to the front of a door other than the door of the dwelling of the destination;

Fifth Level: Permitting moving in all areas; Equivalent to an administrator privilege.

Incidentally, the above-mentioned five steps levels are examples.

The restricting part 216 may perform a behavior restriction by a biometric authentication in various places in the building 20. When a visitor intends to pass through the second key door KD2, the restricting part 216 may unlock it by a biometric authentication, for example. When a visitor intends to ride on the elevator E1 and the elevator EN, the restricting part 216 may perform a restriction of riding on by a biometric authentication, for example. For example, the restricting part 216 may restrict a floor in which a visitor can get off.

Incidentally, the restricting part 216 may restrict persons other than visitors. For example, the restricting part 216 may restrict such that a person, such as a child, who cannot judge whether or not it is dangerous, enters a dangerous area.

[2-4: Fluctuation of Integrated Evaluation Values]

The integrating part 215 may update an integrated evaluation value each time a visitor visits. In other words, the integrated evaluation value may be changed over time.

The integrating part 215 may update the integrated evaluation value with information other than evaluation values by residents. For example, the integrating part 215 may change the integrated evaluation value to become lower when a visitor passes through a route other than a designated route. Moreover, the integrating part 215 may change the integrated evaluation value to become lower when a visitor roughly handles a piece of equipment related to the building. Moreover, the integrating part 215 may change the integrated evaluation value to become lower when a visitor has stayed for an inappropriately long time. Moreover, the integrating part 215 may change the integrated evaluation value to become lower when a delivery person of a home-delivery object has roughly handled the home-delivery object. The integrating part 215 may automatically update the integrated evaluated value on the basis of images that are always captured by a camera.

[2-6: Technical Effect of the Visitor Management Apparatus 2]

In the case of an apartment complex, a person, who is familiar with a resident such as relative and friend, visits, unlike an office building, or the like, including such as an enterprise handling confidential information. Therefore, visitor management, that is equivalent to the office building, or the like, including such as the enterprise handling confidential information, is not practical. For example, for a visitor, it is impractical to become clear whether or not the visitor is a suspicious person.

For example, not everyone can be trusted even if they are employees of a famous home-delivery company. It is reassuring to evaluate individuals even if they are employees of the famous home-delivery company.

Moreover, it is impractical to get high evaluations of many residents in advance for a person who visit all hoses such as a surveyor of the national census.

Thus, in the case of the apartment complex, an inflexible behavior restriction on a visitor is not realistic, and it is inconvenient if the behavior restriction on the visitor is strict.

Since the visitor management apparatus 2 in the second embodiment generates the integrated evaluation value by integrating each of evaluation values by each of residents, it is possible to provide useful information for residents. The visitor management apparatus 2 can combine security and convenience by using both of verification using biometric information and evaluation values by residents. When a visitor is identified by biometric information, the visitor can visit to a destination even if visiting to the destination is not expected, thereby convenience is high. When a visitor visits, since an integrated evaluation value corresponding to the visitor is provided to a resident of a destination to which the visitor visits, the resident can know the latest integrated evaluation value. Since the visitor management apparatus 2 can set such as permission privileges for each of residents of destinations even if a visitor is the same, it is safe. Since it is possible to give to a visit-again person permission privilege, which has been given to the visit-again person previously, or the like, convenient is high. Moreover, a visitor can recognize that the visitor is evaluated, thereby it is expected that service provided by a merchant, who visits to the building 20, will improve.

Incidentally, in the second embodiment, examples, in which a range sharing personal identification information is in the same building or between buildings managed by the same manager, are described, but the range is not limited. For example, persons belonging to a particular same network may share personal identification information. Moreover, personal identification information may be shared in a device authentication such as an electronic certificate, for example.

3: Third Embodiment

Third embodiments of a visitor management apparatus, a visitor management method and a recording medium will be described. Hereinafter, third embodiments of the visitor management apparatus, the visitor management method and the recording medium by using a visitor management apparatus 3 to which the third embodiments of the visitor management apparatus, the visitor management method and the recording medium are applied.

[3-1: Visitor Management System 300]

Figure 6:
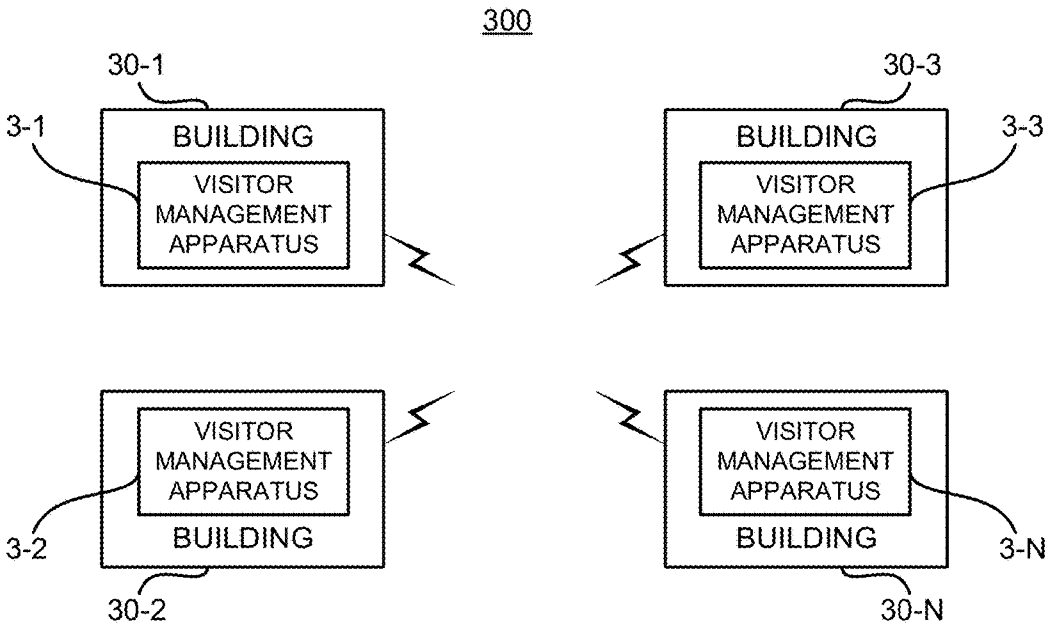
FIG. 6 is a conceptual scheme showing a visitor management system to which a visitor management apparatus in a third embodiment is applied.

The visitor management system 300, to which a visitor management apparatus 3 in the third embodiment is applied, will be described with referring to FIG. 6. FIG. 6 is a conceptual scheme of the visitor management system 300 to which the visitor management apparatus 3 in the third embodiment.

The visitor management system 300 manages visitors visiting to a plurality of buildings. As exemplified in FIG. 6, the visitor management system 300 may manage visitors visiting to buildings 30-1, 30-2, 30-3 and 30-N in a predetermined area, for example. In each of buildings 30-1, 30-2, 30-3 and 30-N, the equivalent visitor management apparatus 3 may be provided. Buildings 30-1, 30-2, 30-3 and 30-N may communicate information with each other. A building 30 may be an apartment complex. Moreover, a building other than an apartment complex may be included as the building 30 in the predetermined area.

For example, it may be determined that an area, in which there is a building visited by the same person within a specified period, is within a range of the predetermined area, in which information is shared. For example, an approximate address may be specified from a global IP address. It may be determined that an area is within the range of the predetermined area on the basis of a global IP address. Moreover, it may be determined that an area is within the range of the predetermined area on the basis of the number of hops and ping of a network. Moreover, a device of a database for each of buildings 30 may store a number allocated for each of predetermined areas. In this case, it may be determined that a building is within a range of a predetermined area when the same number is recorded.

[3-2: Configuration of the Visitor Management Apparatus 3]

Figure 7:
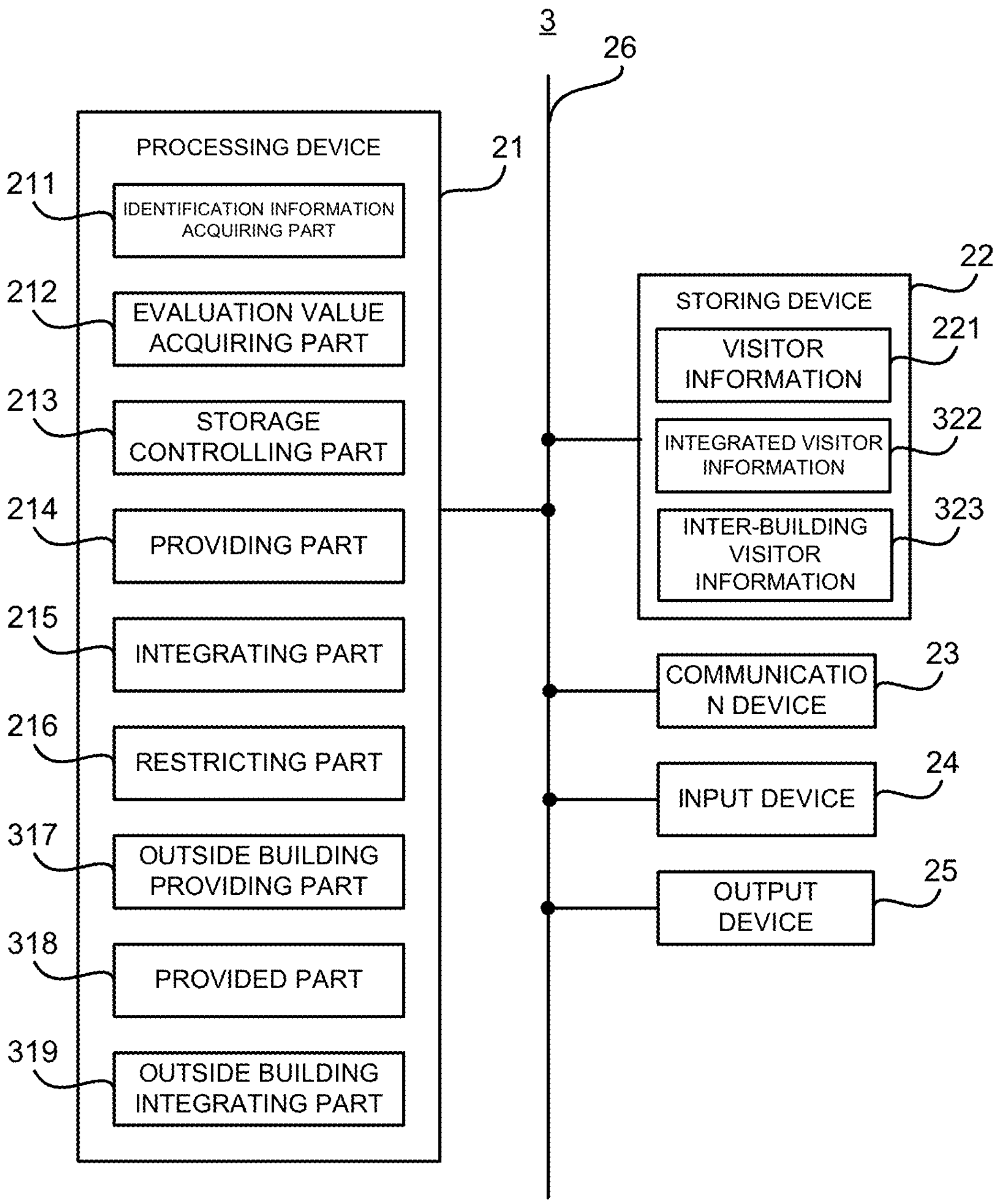
FIG. 7 is a block diagram showing the visitor management apparatus in the third embodiment.

The configuration of the visitor management apparatus 3 will be described with referring to FIG. 7. FIG. 7 is a block diagram showing the configuration of the visitor management apparatus 3 in the third embodiment.

As shown in FIG. 7, the visitor management apparatus 3 in the third embodiment differs from the visitor management apparatus 2 in the second embodiment in that the processing device 21 includes an inter-building providing part 317, a provided part 318 and an inter-building integrating part 319. Other features of the visitor management apparatus 3 may be the same as other features of the visitor management apparatus 2.

[3-3: First Example of Visitor Management Operation Performed by the Visitor Management Apparatus 3]

The visitor management apparatus 3 manages visitors of the building 30 corresponding to the visitor management apparatus 3. The visitor management apparatus 3 makes residents living in the same building 30 share visitor information as well as the visitor management apparatus 2 in the second embodiment. Visitor management operation for making residents living in the same building 30 share the visitor information, that is performed by the visitor management apparatus 3, may be similar to descriptions with referring to the flowchart of FIG. 3.

Figure 8:
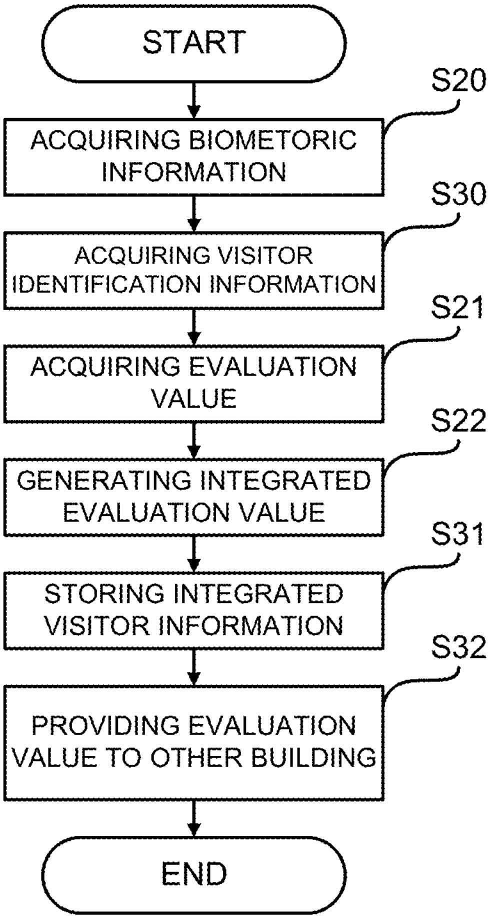
FIG. 8 is a flowchart showing flow of visitor management operation performed by the visitor management apparatus in the third embodiment.

The visitor management apparatus 3 further shares the visitor information with other buildings 30. In this point, the visitor management apparatus 3 in the third embodiment differs from the visitor management apparatus 2 in the second embodiment. FIG. 8 is a flowchart showing flow of visitor management operation for sharing the visitor information with the other buildings 30.

As shown in FIG. 8, the identification information acquiring part 211 acquires biometric information of a visitor visiting to a building (step S20). The identification information acquiring part 211 acquires visitor identification information by changing the biometric information to information from which a specific person can not be identified (step S30).

[Visitor Identification Information]

Biometric information is a personal identification code and corresponds to personal information. Persons sharing an entrance can be regarded as one corporation. For this reason, residents living in the same building can share personal information of visitors.

By the way, it is not easy to provide personal information to third parties. In other words, it is not easy to provide visitor information, in which biometric information and evaluation value are associated with each other, to other buildings.

On the other hand, if it is possible to share information relating to visitors in other buildings, the information can be used as useful information. Therefore, in the third embodiment, in order to share information among buildings, biometric information may be changed to visitor identification information, from which a specific person can not be identified and which can be used to identify each visitor. In other words, the visitor identification information may be information that does not need to be treated as personal information. The visitor identification information may be information relating to person obtained by processing personal information so that a specific person can not be identified.

The visitor identification information may include attribute information of a visitor. The attribute information of the visitor may be information relating to wearing goods of the visitor, a height of the visitor, an outline of a face of the visitor, a physiognomy of the visitor, or the like.

The evaluation value acquiring part 212 acquires an evaluation value for the visitor by residents living in the building (step S21). Incidentally, in the visitor management operation with referring to the flowchart of FIG. 4, it is described that the storage controlling part 213 may associate the biometric information of the visitor, the evaluation value for the visitor by the resident, and the resident identification information for identifying the resident performing evaluation with each other, and store as the visitor information 221 to the storing device 22. The acquiring operation in the step S20 may be acquiring the biometric information corresponding to the visitor which is stored in the storing device 22, and the acquiring operation in the step S21 may be the evaluation value for the visitor by the resident corresponding to the visitor which is stored in the storing device 22.

The integrating part 215 generates an integrated evaluation value by integrating each of evaluation values (step S22). Incidentally, in the visitor management operation for sharing the visitor information with the other buildings 30, the operation of the step S22 may be omitted.

The storage controlling part 213 associates and stores the visitor identification information corresponding to the visitor and the integrated evaluation value corresponding to the visitor (or the evaluation value (if the operation of the step S22 is omitted)) with each other (step S31). The storage controlling part 213 may associate one or more attribute information as the visitor identification information corresponding to the visitor and the evaluation value corresponding to the visitor with each other, and may store as the integrated visitor information 322 in the storing device 22. An example of the integrated visitor information 322 stored in the storing device 22 by the storage controlling part 213 is exemplified in Table 3 below.

TABLE 3

| Visitor attribute information 1 | . . . | Visitor attribute information X | Evaluation value |
|---|---|---|---|
| Wearing goods information A | . . . | Physiognomy information A | 7 |
| Wearing goods information B | . . . | Physiognomy information B | 8 |
| Wearing goods information C | . . . | Physiognomy information C | 4 |

The inter-building providing part 317 provides one or more attribute information and an evaluation value as the visitor identification information stored in the storing device 22, as the integrated visitor identification 322, to other building differing from the building 30 (step S32). Incidentally, in the step S31, the storage controlling part 213 may store the integrated visitor information exemplified in the Table 2 in the storing device 22; in the step S32, the inter-building providing part 317 may provide one or more attribute information and an evaluation value as the visitor identification information from information included in the integrated visitor information 222, i.e., information included in the integrated visitor information 322 exemplified in the Table 3, to the other building differing from the building 30.

[3-4: Second Example of Visitor Management Operation Performed by the Visitor Management Apparatus 3]

Figure 9:
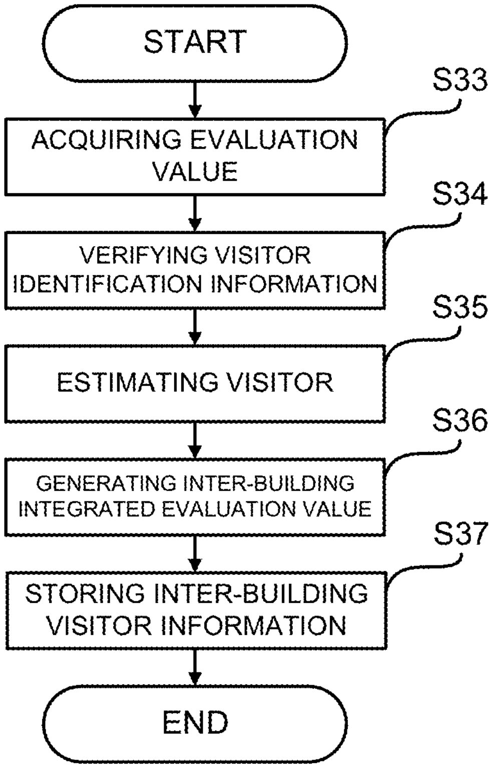
FIG. 9 is a flowchart showing flow of visitor management operation performed by the visitor management apparatus in the third embodiment.

FIG. 9 is a flowchart showing flow of inter-building integrated evaluation value generating operation performed by the visitor management apparatus 3 in the third embodiment.

As shown in FIG. 9, the visitor identification information and the evaluation value acquired by other building are provided to the provided part 318 (step S33).

The inter-building integrating part 319 verifies the visitor identification information provided from the other building with the visitor identification information stored in the storing device 22 (step S34). The inter-building integrating part 319 estimates that the visitor corresponding to the visitor identification information stored in the storing device 22, that succeeded in verification with the visitor identification information provided from the other building, is the visitor corresponding to the visitor identification information provided from the other building (step S35). The inter-building integrating part 319 generates an inter-building integrated evaluation value by integrating the evaluation value (or, the integrated evaluation value (in the building)) corresponding to the visitor identification information provided from the other building and the evaluation value corresponding to the visitor identification information stored in the storing device 22 (step S36).

The inter-building integrating part 319 may integrate evaluation values by adding each of evaluation values. The inter-building integrating part 319 may generate the inter-building integrated evaluation value on the basis of comparing evaluation values and a predetermined threshold value.

The inter-building integrating part 319 may generate information indicating distribution of each of evaluation values as the inter-building integrated evaluation value. The inter-building integrating part 319 may generate a histogram of each of evaluation values. When the histogram is generated, it is possible to easily understand how many residents having performed high-evaluation in an area, and how many residents having performed low-evaluation in the area. The inter-building integrating part 319 can generate information that allows reference to evaluations of all residents living in the area.

When evaluation values are integrated, it is easy to understand evaluations of all of residents for visitors, especially when there are many residents living in the area. Since a resident visited by a visitor easily judges about the visitor, it is convenient.

The storage controlling part 213 associates and stores the visitor identification information corresponding to the visitor and the integrated evaluation value corresponding to the visitor with each other (step S37). The storage controlling part 317 may associate one or more attribute information as visitor identification biometric information corresponding to the visitor and the integrated evaluation value corresponding to the visitor with each other, and may store as the inter-building information 323 in the storing device 22. An example of the inter-building visitor information 323 stored in the storing device 22 by the storage controlling part 213 is exemplified in Table 4 bellow.

TABLE 4

| Visitor attribute information 1 | . . . | Visitor attribute information X | Evaluation value |
|---|---|---|---|
| Wearing goods information A | . . . | Physiognomy information A | 8 |
| Wearing goods information B | . . . | Physiognomy information B | 8 |
| Wearing goods information C | . . . | Physiognomy information C | 5 |

[3-5: Third Embodiment of Visitor Management Operation Performed by the Visitor Management Apparatus 3]

Figure 10:
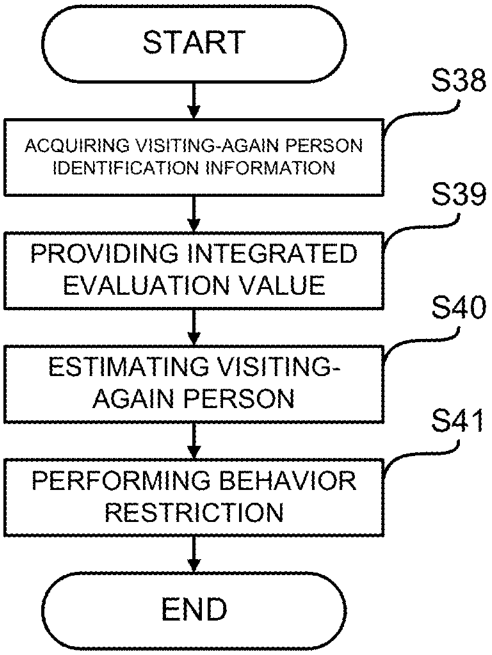
FIG. 10 is a flowchart showing flow of behavior restriction operation performed by the visitor management apparatus in the third embodiment.

As an example of using the inter-building integrated evaluation value, the visitor management apparatus 3 may perform behavior restriction operation for a visitor. FIG. 10 is a flowchart showing flow of the behavior restriction operation performed by the visitor management apparatus 3 in the third embodiment.

As shown in FIG. 10, the identification information acquiring part 211 acquires visiting-again person identification information of a visiting-again person visiting again (step S38). The identification information acquiring part 211 may the visiting-again person identification information of the visiting-again person by operating the visitor operating terminal T0 by the visiting-again person.

The providing part 214 provides the inter-building visitor information 323 stored in the storing device 22 to a resident of a destination of the visiting-again person (step S39). Moreover, when the visitor information 221 by the resident of the destination of the visiting-again person is stored in the storing device 22, the providing part 214 may provide the visitor information 221 to the resident.

The restricting part 216 estimates which person the visiting-again person is on the basis of the visiting-again person identification information (step S40). The restricting part 216 may search visitor identification information of the same person as the visiting-again person from the visitor identification information stored in the storing device 22 on the basis of the visiting-again person identification information. The restricting part 216 imposes behavior restriction corresponding to an integrated evaluation value associated with the visitor identification information of the same person (step S41). The restricting part 216 may perform behavior restrictions of the five-steps levels described in the second embodiment according to the inter-building integrated evaluation value, for example.

Even if a visitor visits to a building at first time, if the visitor has visited to a neighboring building, an access authority, or the like such as behavior restriction in the neighboring building may be applied to the visitor.

Moreover, the restricting part 216 may change behavior restriction imposed on the visiting-again person in response to a request of the behavior restriction based on at least one of the visitor information 221 and the inter-building visitor information 323 by a resident of a destination of the visiting-again person. For example, when a resident of a destination rejects a visitor, the restricting part 216 may restrict behavior toward a door of a dwelling of the destination even if the visitor is a person having a high inter-building integrated evaluation value.

On the other hand, if a visitor has a high inter-building integrated evaluation value, the restricting part 216 may allow the visitor to enter a door of a dwelling of a destination without obtaining permission of a resident of the destination. In this case, the operation of the step S39 may be omitted.

[3-6: Modification]

Figure 11:
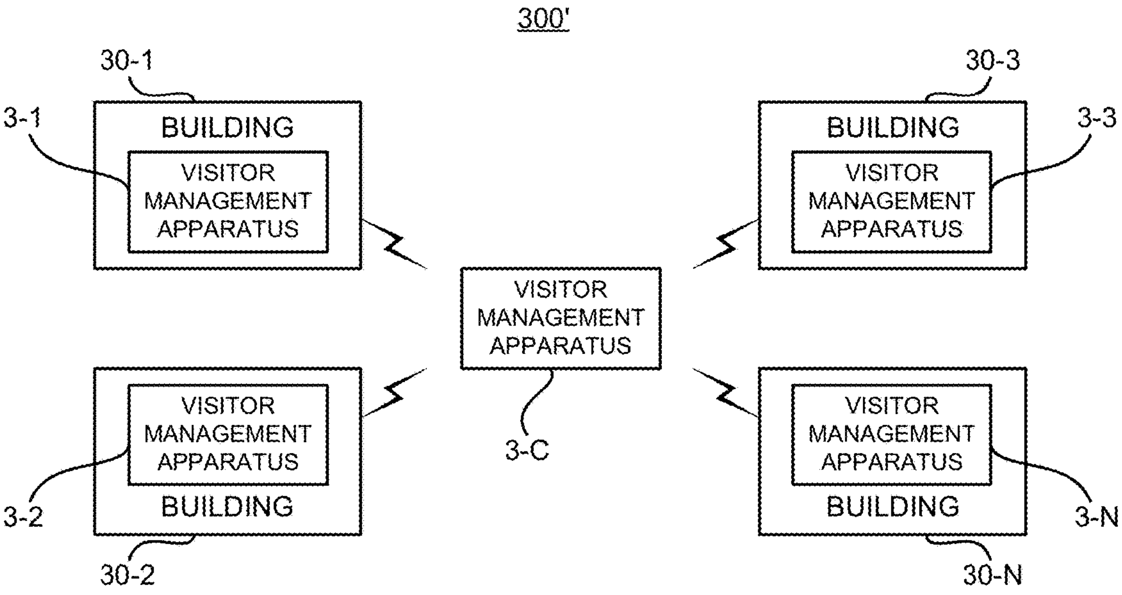
FIG. 11 is a conceptual scheme showing a modified example of a visitor management system to which the visitor management apparatus in the third embodiment is applied.

A visitor management system 300', to which the visitor management apparatus 3 in the third embodiment is applied, and which is a modification of the third embodiment, will be described with referring to FIG. 11. FIG. 11 is a conceptual scheme of the visitor management system 300' to which the visitor management apparatus 3 in the third embodiment is applied.

In the above-mentioned third embodiment, a case in which information is transmitted and received directly between buildings has been described as an example. As shown in FIG. 11, a visitor management apparatus 3-C which is not associated with each of buildings 30 may be provided. In this case, the visitor management apparatus 3-C may receive information from visitor management apparatuses 3 associated with buildings 30, and may transmit an integrating result to each of visitor management apparatuses 30. Each of visitor management apparatuses 3 may perform visitor management operation by using an inter-building integrated evaluation value which is integrated in the visitor management apparatus 3-C. The visitor management apparatus 3-C may be a cloud server.

[Example of Using Attribute Information]

Since attribute information is information from which a specific person can not be identified, there are cases in which a visitor can not be identified on the basis of only single attribute information. Therefore, multiple types of attribute information may be associated with a single visitor. By combining a plurality of attribute information, it is possible to improve possibility of identifying a visitor. Moreover, by narrowing a range of an area in which information is shared, it is possible to improve possibility of identifying a visitor.

On the other hand, the same attribute information may be positively associated with different visitors. For example, the integrating part 215 may generate evaluation value of each of companies based on attribute information common to a plurality of persons such as a uniform of a company, in addition to an integrated evaluation value for a single person. For example, persons, who wear a uniform of a home-delivery company having a delivery person having a high evaluation value, have the same attribute information. A delivery person having this attribute information may be allowed to use a home-delivery box in a corresponding area, for example. Moreover, a visitor having attribute information with a high evaluation value in a plurality of buildings may be able to obtain at least a part of a common access right in a corresponding area, for example.

Incidentally, as other shared information relating to a visitor, the visitor information 221 may be given label information such as a delivery person, a resident, a friend of a resident, and solicitation. The label information may be given by the evaluation value acquiring part 212 when a resident evaluates a visitor.

Moreover, the identification information acquiring part 211 may use a liveness function. This allows to prevent spoofing using photographs, image, and the like, thereby it is possible to improve security.

[3-7: Technical Effects of the Visitor Management Apparatus 3]

Since the visitor management apparatus 3 in the third embodiment provides a visitor identification information and an evaluation value other building other than a building, it is possible to share an evaluation value of a visitor between buildings. For example, when a visitor visits to a building at the first time, it is possible to manage behavior of the visitor in the building by an evaluation for the visitor in other neighboring building, thereby convenient is high. Since the visitor identification information is information, from which a specific person can not identified, changed from biometric identification, the visitor identification information can be shared among buildings without any difficulty. Since the visitor management apparatus 3 generates an integrated evaluation value, it is possible to provide useful information for residents. Since a resident of a destination of a visitor can judge the visitor by using an integrated evaluation value integrated more evaluation values, it is possible to judge with high usefulness. Moreover, since an integrated evaluation value corresponding to a visitor is provided to a resident when the visitor visits the resident, the resident can know the latest integrated evaluation value. The visitor management apparatus 2 can combine security and convenience by using both of verification using visitor identification information and evaluation values by residents. When a visitor is identified by the visitor identification information, the visitor can visit to a destination even if visiting to the destination is not expected, thereby convenience is high.

4: Supplementary Note

In regard to embodiments described above, the following supplementary notes will be further disclosed.

Supplementary Note 1

A visitor management apparatus comprising:

an identification information acquiring means for acquiring biometric information of a visitor coming to a building;

an evaluation value acquiring means for acquiring each of evaluation values for visitors by resident s living in the building;

an integration means for generating an integrated evaluation value by integrating each of evaluation values by each of residents;

a storing means for storing the biometric information corresponding to the visitor and the integrated evaluation value corresponding to the visitor in association with each other; and a providing means for providing the integrated evaluation value corresponding to the visitor stored in the storing means to a resident living in the building.

Supplementary Note 2

The visitor management apparatus according to the supplementary note 1, wherein the identification information acquiring means acquires visiting-again person biometric information of a visiting-again person coming to the building again, the visitor management apparatus further comprises a restricting means for searching biometric information of a person, who is the same as the visiting-again person, from biometric information stored in the storing means on the basis of the visiting-again person biometric information, and for imposing a behavior restriction, that corresponds to the integrated evaluation value corresponding to the biometric information of the person who is the same as the visiting-again person, on the visiting-again person.

Supplementary Note 3

The visitor management apparatus according to the supplementary note 1 or 2, wherein the providing means provides the integrated evaluation value corresponding to the visitor stored in the storing means to a resident, who lives in the building and is in a destination of the visitor.

Supplementary Note 4

A visitor management method including:

acquiring biometric information of a visitor coming to a building;

acquiring each of evaluation values for visitors by residents living in the building;

generating an integrated evaluation value by integrating each of evaluation values by each of residents;

storing the biometric information corresponding to the visitor and the integrated evaluation value corresponding to the visitor in association with each other; and providing the stored integrated evaluation value corresponding to the visitor to a resident living in the building.

Supplementary Note 5

A recording medium on which a computer program is recorded, wherein the computer program causes a computer to execute a management method including: acquiring biometric information of a visitor coming to a building, acquiring each of evaluation values for visitors by residents living in the building, generating an integrated evaluation value by integrating each of evaluation values by each of residents, storing the biometric information corresponding to the visitor and the integrated evaluation value corresponding to the visitor in association with each other, and providing the stored integrated evaluation value corresponding to the visitor to a resident living in the building.

At least a part of components of each of the above-mentioned embodiments may be combined with at least another part of components of each of the above-mentioned embodiments. A part of components of each of the above-mentioned embodiments may be not used. In addition, to the extent permitted by law, the disclosures of all documents (e.g., publications) cited in this disclosure above are incorporated by reference into this disclosure.

This disclosure can appropriately be changed within limits being not contrary to summary of inventions or ideas, that can be read from the scope of claims and all of the specification, a visitor management apparatus, a visitor management method and a recording medium with such changes are also included in technical ideas of this disclosure.

DESCRIPTION OF REFERENCE CODES

1, 2, 3 Visitor management apparatus
11, 211 Identification information acquiring part
12, 212 Evaluation value acquiring part
13 Storing part
213 Storage controlling part
221 Visitor information
222, 322 Integrated visitor information
12, 214 Providing part
15, 215 Integrating part
216 Restricting part
20, 30 Building
300, 300' Visitor management system
317 Inter-building providing part
318 Provided part
319 Inter-building integrating part
323 Inter-building visitor information

What is claimed is:

1. A visitor management apparatus comprising:

at least one memory configured to store instructions; and at least one processor configured to execute the instructions to:

acquire biometric information of a visitor coming to a building;

acquire each of evaluation values for visitors by residents living in the building;

generate an integrated evaluation value by integrating each of the evaluation values by each of residents;

store the biometric information corresponding to the visitor and the integrated evaluation value corresponding to the visitor in association with each other in a storage;

provide the stored integrated evaluation value corresponding to the visitor to a resident living in the building;

acquire visiting-again person biometric information of a visiting-again person coming to the building again;

search biometric information of a person, who is the same as the visiting-again person, from the biometric information stored in the storage on the basis of the visiting-again person biometric information; and impose a behavior restriction, that corresponds to the integrated evaluation value corresponding to the biometric information of the person who is the same as the visiting-again person, on the visiting-again person.

2. The visitor management apparatus according to claim 1, wherein the at least one processor is configured to execute the instructions to provide the integrated evaluation value corresponding to the visitor stored in the storage to a resident, who lives in the building and is in a destination of the visitor.

3. A visitor management method including:

acquiring biometric information of a visitor coming to a building;

acquiring each of evaluation values for visitors by residents living in the building;

generating an integrated evaluation value by integrating each of the evaluation values by each of residents;

storing the biometric information corresponding to the visitor and the integrated evaluation value corresponding to the visitor in association with each other in a storage;

providing the stored integrated evaluation value corresponding to the visitor to a resident living in the building;

acquiring visiting-again person biometric information of a visiting-again person coming to the building again;

searching biometric information of a person, who is the same as the visiting-again person, from the biometric information stored in the storage on the basis of the visiting-again person biometric information; and imposing a behavior restriction, that corresponds to the integrated evaluation value corresponding to the biometric information of the person who is the same as the visiting-again person, on the visiting-again person.

4. The visitor management method according to claim 3, wherein the at least one processor is configured to execute the instructions to provide the integrated evaluation value corresponding to the visitor stored in the storage to a resident, who lives in the building and is in a destination of the visitor.

5. A non-transitory recording medium on which a computer program is recorded, wherein the computer program causes a computer to execute a management method including:

acquiring biometric information of a visitor coming to a building;

acquiring each of evaluation values for visitors by residents living in the building;

generating an integrated evaluation value by integrating each of the evaluation values by each of residents;

storing the biometric information corresponding to the visitor and the integrated evaluation value corresponding to the visitor in association with each other in a storage;

providing the stored integrated evaluation value corresponding to the visitor to a resident living in the building;

acquiring visiting-again person biometric information of a visiting-again person coming to the building again;

searching biometric information of a person, who is the same as the visiting-again person, from the biometric information stored in the storage on the basis of the visiting-again person biometric information; and imposing a behavior restriction, that corresponds to the integrated evaluation value corresponding to the biometric information of the person who is the same as the visiting-again person, on the visiting-again person.

* * * * *